United States Patent Office 3,352,794
Patented Nov. 14, 1967

3,352,794
PROCESS FOR MAKING A TEMPERATURE SENSITIVE COLOR REVERSIBLE PIGMENT AND RESULTING PRODUCT
Daniel A. Abdo, Seattle, Wash., assignor to The Boeing Company, Seattle, Wash., a corporation of Delaware
No Drawing. Filed July 7, 1964, Ser. No. 380,928
8 Claims. (Cl. 252—408)

ABSTRACT OF THE DISCLOSURE

A heat sensitive composition indicating temperature change by reversible color change has the composition of $XAgI \cdot HgI_2$, wherein X is a whole number varying between 4 and 80, said composition having a nitrate ion impurity. A process for making the reversible temperature-dependent color characteristic composition comprises the step of (a) reacting ionized silver nitrate and potassium iodide which results in a distinguishable yellow precipitate, (b) aging the precipitate until an olive drab color results, (c) reacting the precipitate with red mercuric iodide and (d) cycling the temperature of the reaction product of (c) below its decomposition temperature to set the color changes of the product.

---

This process relates in general to a new method of making a temperature sensitive color reversible pigment and the resulting product. More particularly this invention relates to the process for making a double salt of a silver iodide and red mercuric iodide and the resulting product.

Traditionally devices such as thermometers, thermocouples, radio meter bulbs, contact mirrors and the like have been used to demonstrate heat phenomena. Apparatus of these prior categories have suffered from one or more disadvantages such as cost, inconvenience and fragility. For certain demonstrations, such as the focusing of infrared heat rays, relatively strong heat sources have been required. For demonstrating the many heat effects of interest moreover, an expensive apparatus has been required. For these reasons, many important or interesting heat experiments could not possibly be carried out by individual students or experimenters and were confined to lecture demonstrations. Also on the lecture platform many such demonstrations involving thermocoupled or meter readings have been poorly discernible at a distance or have lacked visual appeal.

It is an object of the instant invention to fill the need for inexpensive, compact and dependable means for visually illustrating heat effects in a striking manner.

Another object of this invention is to improve the color change contrast of a double halide salt of silver and mercury.

Another object of this invention is to perfect the double halide salt of silver and mercury so that it has distinct and gradual color changes with temperature change.

Another object of this invention is to perfect a double halide salt of silver and mercury which will have stable colors and color changes for many cycles thus enabling it to be used in many industrial applications requiring long life.

Other objects and applications of this invention will become obvious to those who read the following description and appended claims.

In brief, this invention is a new process for preparing a material having temperature indicating properties through color changes, said material consisting essentially of a double halide salt of silver and mercury. Broadly speaking this process for making a reversible temperature-dependent color characteristic composition comprises the steps of (a) reacting ionized silver nitrate and potassium iodide which results in a distinguishable yellow precipitate, (b) aging the precipitate until an olive drab color results, (c) reacting the precipitate with red mercuric iodide and (d) cycling the temperature of the reaction product of (c) below its decomposition temperature thus setting the color changes of the reaction product. This last step is optional as far as perfecting the invention is concerned.

This process is practiced in the following manner: Equal weights of silver nitrate and potassium iodide are dissolved in excess boiling water in separate containers; after it can be seen that the silver nitrate and potassium iodide are fully dissolved either may be added to the other; the result of this is a yellow precipitate. The solution is allowed to stand so that full precipitation will result, during which time the solution cools to room temperature. The liquid is decanted from the solid precipitate. The precipitate is washed at least once, but not more than twice. The precipitate is allowed to stand for 24 hours for full development of an olive drab color. Red mercuric iodide is added to the dry precipitate to give the desired ratio of silver iodide to mercuric iodide. The reaction product of the precipitate with the mercuric iodide is mixed into a slurry with water and then dried over low heat. The product is ground to a fine powder when it is dry.

At this point the synthesis of the material is complete. However, to further complete the development of this material, the material as it exists in powder form is cycled from room temperature to approximately 450° F. at least twice. The purpose of this temperature cycle is to set and stabilize the colors of the resulting powder. Care is practiced so that the material is not heated above its decomposition point which is approximately 475° F. or higher, when the material is encapsulated in another medium.

The product resulting from the above process has the following chemical formula:

$$XAgI \cdot HgI_2$$

wherein X is a whole number varying between the operative values of 4.0 to 80.0 with particular effective values of 5.9 to 6.5.

This chemical formula has the novelty of composition in its ratio of silver iodide to red mercuric iodide that has been found most stable to this date.

This material as represented by the above has not been attainable by normal methods of preparing previous material. The material which I have prepared has the following gradual color changes all of which are reversible:

80° F. yellow with deepening shades to orange at 115° F.
115° F. orange with deepening shades to red at 250° F.
250° F. red with deepening shades to maroon at 300° F. and,
300° F. maroon with deepening shades to purple-black at 425° F.

At a temperature at somewhat above 475° F., it is believed the material decomposes and is no longer reversible when heated. The above temperature transition in colors are approximate and a range above and below the temperature of 5° F. should be allowed on each reading. This product varies markedly from that described in previous literature in both its physical properties and its chemical properties as well as its color characteristics. The color exhibited by this material is a solid, definitely distinguishable color. The color transitions from one shade to another are more definite than previously known before. These properties of the instant material are derived because of the novel method of preparation which allows fuller reaction of the constituents so that the new composition range given above is obtained.

In the process which I have developed it is essential that the freshly prepared silver iodide (AgI) and a trace of silver nitrate (AgNO₃) have a controlled exposure to light because these materials are photo-sensitive. Secondly, a controlled impurity is essential in the resulting material of this process. Small amounts of silver nitrate (AgNO₃) are present in the normal practice of this invention and serve the purpose of controlled impurity. Third it is believed that a combination of a photosensitive trimorphic compound (AgI) with a bimorphic compound (HgI) is essential for a multiple colored change such as that described.

Color changes are believed to be due to the trimorphic character of AgI and the bimorphic character of HgI₂. Both of these compounds undergo changes in crystalline structure with change in temperature. Examples of crystalline changes with temperature are given below:

Silver iodide

555°–146° C. (1030°–295° F.) dark brown alpha form which is cubic,
146°–137° C. (295°–279° F.) greenish yellow hexagonal beta form,
137° C. (279° F.) and lower; the cubic gamma form is the most stable,

Mercuric iodide

259°–126° C. (498°–259° F.) yellow rhombohedral form,
126° C. (259° F.) and below; red tetrahedral form.

It is in the interaction and resulting modification of these crystalline forms that appears to be the primary cause of color change with temperature.

The nitrate Ion $NO^-_3$ concentration is the controlled impurity that has been found to (a) modify the transition temperatures,
(b) stabilize the compound to prevent decomposition with temperature cycling,
(c) make the compound light sensitive and retard color reversal when present in excess of approximately 1.0%.

The nitrate ion concentration has been found to have the following effect on the initial color transition (yellow to orange) temperature when using the ratio 5.9:1 to 6.5:1 AgI·HgI₂.

| Nitrate ion concentration (percent): | Transition temp. |
| --- | --- |
| 1.73 | 43° C. (110° F.) |
| 0.27 | 46° C. (115° F.) |
| 0.04 | 49° C. (120° F.) |

The increases in transition temperature with decreasing nitrate ion concentration becomes more pronounced at the higher transition temperatures. If the higher concentration (approximately 1% or more) of $NO^-_3$ is used the pigment becomes quite light sensitive. This material should be kept in relatively light-free storage before incorporating into a varnish vehicle or plastic medium to prevent darkening of the pigment. Once it is thus incorporated, the material is relatively insensitive to light.

This same high concentration of $NO^-_3$ has been found to retard to some degree the reversal of color upon cooling. While $NO^-_3$ exhibits this function as an impurity, it is not thought to be the exclusive material to exhibit this phenomena.

Many applications of the instant invention will immediately come to mind. The material was originally sought to conveniently indicate the temperature of electronic devices when being tested. Some examples of other applications would be (1) handles on tools and cooking utensiles subject to temperature variations, for the protection of the operator, (2) bearing housings, for certain bearings that are subject to overheating, (3) printed circuits where temperature and temperature gradients are important and (4) wind tunnel models to show temperature gradients along the model.

The material of this invention can be incorporated in either a resin or silicon varnish. The latter varnish is more suitable when the material is going to be used at higher temperatures because it has a higher temperature stability. Little or no color alterations are brought about by incorporating the instant material of this invention into the varnish. People familiar with the present art will realize that the material for the instant invention can also be worked into plastics. Examples of this would be linear polyethylene or polytetrafluoroethylene. The upper temperature limits of the instant material is exceeded when sealed in glass or bound by some other high temperature material. If the material is exposed to air, temperatures of 450°–475° F. should not be exceeded.

Modification in the preparation of the instant material can be among the following. During preparation of the silver iodide, pour off the solution once the development of an olive drab color is noted on the previously pale yellow precipitate. An ideal temperature during the above preparation would be approximately 120° F. (48° C.). Better results are obtained if the precipitate is not washed. Allow the material to develop a full olive drab color on the surface (usually 24 to 96 hours). When dry the material should be further broken up and stirred and the lighter material underneath allowed to darken for about 30 minutes. This latter procedure is repeated twice to allow a fuller color development.

While I have described and illustrated some preferred forms of my invention, it should be understood that many modifications may be made without departing from the spirit and the scope of the invention and it should therefore be understood that the invention is limited only by the scope of the appended claims.

I claim:

1. A composition of matter having reversible temperature-dependent color characteristics comprised of an impure iodide of silver and mercury wherein the molecular ratio of silver iodide to mercuric iodide varies from 4.0 to 80.0 and the impurity is a compound providing a source of nitrate ions.

2. A composition of matter having reversible temperature-dependent color characteristics comprised of an impure iodide of silver and mercury wherein the molecular ratio of silver iodide to mercuric iodide varies from 4.0 to 80.0 and the impurity is silver nitrate present in trace quantities.

3. A composite article having reversible temperature-dependent color characteristics comprised of a colorless material selected from the group consisting of varnishes and plastics impregnated with an impure iodide of silver and mercury wherein the molecular ratio of silver iodide to mercuric iodide varies from 4.0 to 80.0 and the impurity is a compound providing a source of nitrate ion.

4. A composite article having reversible temperature-dependent color characteristics comprised of a colorless material selected from the group consisting of varnishes and plastics impregnated with an impure ioidide of silver and mercury wherein the molecular ratio of silver iodide to mercuric iodide varies from 4.0 to 80.0 and the impurity is silver nitrate present in the trace quantities.

5. A composite article having reversible temperature-dependent color characteristics comprised of a colorless organic material selected from the group consisting of varnishes and plastics encapsulating an impure iodide of silver and mercury wherein the molecular ratio of silver iodide to mercuric iodide varies from 4.0 to 80.0 and the impurity is a compound providing a source of nitrate ions.

6. A composite article having reversible temperature-dependent color characteristics comprised of a colorless organic material selected from the group consisting of varnishes and plastics encapsulating an impure iodide of silver and mercury wherein the molecular ratio of silver iodide to mercuric iodide varies from 4.0 to 80.0 and the impurity is silver nitrate present in trace quantities.

7. A process for making a reversible temperature-dependent color characteristic composition comprising the steps of (a) reacting ionized silver nitrate and potassium iodide which results in a distinguishable precipitate, (b) aging the precipitate until an olive drab color results, (c) reacting the precipitate with mercuric iodide, and (d) cycling the temperature of the reaction product of step (c) below its decomposition temperature thus setting the color changes of the reaction product.

8. A process for making a reversible temperature-dependent color characteristic composition comprising the steps of (a) reacting ionized silver nitrate and potassium iodide which results in a distinguishable precipitate, (b) aging the precipitate until an olive drab color results and (c) reacting the precipitate with mercuric iodide.

References Cited

UNITED STATES PATENTS

| | | |
|---|---|---|
| 1,692,012 | 11/1928 | Wells. |
| 1,693,369 | 11/1928 | Cochran. |
| 2,163,918 | 6/1939 | Schwartz _____ 252—408 X |
| 2,637,657 | 5/1953 | Ozols _____ 73—356 X |
| 2,723,914 | 11/1955 | Suchow _____ 252—408 X |
| 2,892,798 | 6/1959 | Dobbs et al. _____ 252—408 |
| 2,945,305 | 7/1960 | Strickler _____ 73—356 |

LEON D. ROSDOL, *Primary Examiner.*

M. WEINBLATT, *Assistant Examiner.*